US008348737B2

(12) United States Patent
Page

(10) Patent No.: US 8,348,737 B2
(45) Date of Patent: Jan. 8, 2013

(54) METHOD FOR CONDUCTING AN ONLINE CONTEST

(76) Inventor: Everett Page, Seattle, WA (US)

( * ) Notice: Subject to any disclaimer, the term of this patent is extended or adjusted under 35 U.S.C. 154(b) by 230 days.

(21) Appl. No.: 12/785,303

(22) Filed: May 21, 2010

(65) Prior Publication Data

US 2010/0298038 A1 Nov. 25, 2010

Related U.S. Application Data

(60) Provisional application No. 61/180,384, filed on May 21, 2009.

(51) Int. Cl.
*G06F 17/00* (2006.01)

(52) U.S. Cl. ................................ 463/10; 463/9; 463/42

(58) Field of Classification Search ................ 463/9, 10, 463/42

See application file for complete search history.

(56) References Cited

U.S. PATENT DOCUMENTS

| | | | | |
|---|---|---|---|---|
| 5,779,242 | A * | 7/1998 | Kaufmann | 273/459 |
| 6,092,806 | A * | 7/2000 | Follis | 273/138.1 |
| 7,682,251 | B2 * | 3/2010 | Bortnik et al. | 463/42 |
| 7,914,380 | B2 * | 3/2011 | Takahashi | 463/40 |
| 8,099,182 | B1 * | 1/2012 | Kasten | 700/91 |
| 2003/0186744 | A1 * | 10/2003 | Bradell | 463/42 |
| 2008/0234041 | A1 * | 9/2008 | Berman | 463/27 |
| 2008/0248846 | A1 * | 10/2008 | Stronach et al. | 463/6 |
| 2009/0054153 | A1 * | 2/2009 | Abekasis et al. | 463/42 |
| 2009/0170584 | A1 * | 7/2009 | Tan et al. | 463/16 |
| 2010/0093415 | A1 * | 4/2010 | Kasten | 463/9 |
| 2011/0034225 | A1 * | 2/2011 | Butz et al. | 463/4 |

OTHER PUBLICATIONS

Young, Andy, "Rugby: Georgia beat Russia to top European Nations Cup table" Mar. 28, 2009, www.siberianlight.net.*

* cited by examiner

*Primary Examiner* — Michael Cuff
(74) *Attorney, Agent, or Firm* — Merchant & Gould P.C.

(57) ABSTRACT

A method for conducting an online contest involving "fantasy" type sporting games through the use of bracketing rules such that a player can employ decision-making via strategic moves as well as by mathematical equation. The method integrates hundreds of thousands of fantasy players into a unitary online contest where each fantasy player seeks to advance through various brackets in order to win prizes derived from the mass amount of entry fees.

20 Claims, 3 Drawing Sheets

METHOD FOR CONDUCTING AN ONLINE CONTEST

This is a non-provisional application claiming priority to provision patent application No. 61/180,384 filed on May 21, 2009.

FIELD OF THE PRESENT INVENTION

The present invention relates to a method for conducting an online contest involving "fantasy" type sporting games through the use of bracketing rules such that a player can employ decision-making via strategic moves as well as mathematical equation.

BACKGROUND OF THE PRESENT INVENTION

Participation in sporting events and leagues does not always involve actual play. A very popular method of getting involved in sports, particularly professional and collegiate, is through "fantasy" leagues. Such fantasy leagues allow individuals to interact with other fantasy "players" to essentially run a team. The teams are based on actual athletes and their statistics, with scoring typically based on these statistics compiled for each actual athlete, or for selected categories (such as defense) during each game or match. Fantasy sports—particularly baseball, American football, basketball and auto racing—are now a major part of our sporting culture. Game and athlete statistics have been added to sports broadcasts and even scoreboards at actual events so that fantasy players in the crowd can monitor their fantasy statistics. Fantasy statistics also are now included in newspapers, magazines and online outlets. Because fantasy sports require fantasy players to educate themselves on actual athletes' statistics from across the real league, the game has been credited with making casual fans more knowledgeable about on goings outside of their own preferred real teams.

According to the San Francisco Chronicle, fantasy football originated in 1962 when members of the Oakland Raiders front office and sports reporters developed a method of playing such a game. In fact, the method employed by this initial group of fantasy players has remained very similar. Each league had between 8-12 teams, with each team being run by a fantasy player. Quarterback George Blanda was the first-ever pick in a draft that is conducted very similar to the ones today. Teams had to choose four receivers, four halfbacks, two fullbacks, two quarterbacks, two kick returners, two placekickers, two defensive backs or linebackers and two defensive linemen. Various rules today allow for slightly different versions of the makeup of each fantasy team. But the only significant change in fantasy football and fantasy sports in general is use of online communications.

Online fantasy football has been embraced by numerous outlets such as CBS SPORTS™, YAHOO!™ and ESPN™. Typically, individual players sign on to play in public or private leagues comprised of about 12 fantasy teams. Each league is completely separate from other leagues, although some online outlets tally compiled points under some circumstances within their individual online venue. But the problem remains that current online fantasy methods essentially are venues consisting of completely separate leagues with the goal of consistently winning the individual league. What happens is that many fantasy players sign up for multiple leagues in order to increase the experience. But the same problems still exists in that these players still are only seeking to win the small leagues that are segregated from the others. As such, there is a need for a method of conducting an online contest where each player can compete within their leagues but also work toward a greater interaction with other leagues. The present invention solves this need by creating a method where brackets and specific rules allow each player to compete on this heightened level of play.

Another problem with current fantasy sports methods relates to prizes and scope of the contest. Typically, fantasy sports venues may offer a prize to the winner of each league. The prize may be a virtual trophy or a pot of money based on entry fees. But again, the prize money in particular is limited to the relatively small number of participants in each league. Theoretically, a league can have well more than 12 teams, but a significantly increased number of participants would severely affect parity as lower draft picks beyond 12 would be at a notable disadvantage. The result is that fantasy players cannot expect a significant windfall of winnings unless they participate in a "high-roller" type league. This means that there is a need for a method of conducting an online contest where a player paying even a nominal entry fee can use strategy and means of determining probability to potentially win a massive prize based on all entry fees. The present invention solves this problem by using a bracket and specific method in order to tie together mass quantities of individual players while preserving the 12-team leagues.

U.S. Pat. No. 6,371,855 issued to Gavriloff on Apr. 16, 2002 is a fantasy internet sports game. Gavriloff employs a system that ties the internet to fantasy sports where data and other information can be stored. Unlike the present invention, Gavriloff applies value-based rewards to participants that correlate with the value and performance of the actual athletes on the fantasy team. In contrast, the present invention provides a method to integrate hundreds of thousands of fantasy players into a unitary online contest where each fantasy player seeks to advance through various brackets in order to win prizes derived from the mass amount of entry fees. In addition, the method described below of allowing a contestant to choose in all draft positions allows for a different way of conducting strategy and gamesmanship.

U.S. Pat. No. 6,669,565 issued to Liegey on Feb. 5, 2001 is a method of conducting a fantasy sports game. Liegey uses a fantasy sports method that increases available points for winning draft picks taken in the later rounds as well as permitting players to trade teams. Unlike the present invention, Liegey also depends award points on various rounds of a tournament and seeding placement of a winning team. In contrast, the present invention provides a method to integrate hundreds of thousands of fantasy players into a unitary online contest through a much more elaborate bracket methodology where each fantasy player seeks to advance through various brackets in order to win prizes derived from the mass amount of entry fees. Moreover, the present invention is such that one team out of the 12 teams operated by a player will draft first, an additional team will draft second and on up to the $12^{th}$ draft position. This function of the present invention permits each player to adopt various draft strategies rather than being limited to completely random draft orders for all teams.

SUMMARY OF THE PRESENT INVENTION

The present invention is a method for conducting an online contest that allows fantasy sports players to participate in a unitary online contest in order to win prizes derived from a mass amount of entry fees. The present invention permits a player to participate in a unitary competition with 12 different draft positions, which offers a more mathematical and strategic process of play. The method in the preferred embodiment relates to a bracketing system that permits each contestant the opportunity to employ mathematical and strategic decisions in bracketed competition against up to 248,832 contestants. The brackets in the preferred embodiment relate to "fantasy" type sporting games that refer to actual athletes and their statistical results. The preferred embodiment of the present invention involves American football.

The present invention is conducted via online means. A computing device in the preferred embodiment is used by each contestant, with the computing device being linked to a server such that all contestants can participate, store records, conduct drafts, compile information and otherwise perform all necessary tasks to compete.

Each contestant in the preferred embodiment creates 12 virtual teams. Each virtual team is separated into its respective secondary brackets. Each secondary bracket is associated to a primary bracket, with there being 12 primary brackets in the preferred embodiment. In all, there are 144 total brackets in the preferred embodiment, with 1,728 leagues from which the brackets branch off. The rules are such that each contestant initially competes with his or her separate 12 teams. The competition and number of contestants dwindles at specific weekly increments, as contestants from each secondary bracket that are leading in accumulated points will advance to a new round. Winners will emerge out of the secondary brackets and then compete to win the primary brackets. Ultimately, a final 12 from the entire league will compete in a finals competition that extends through the following season.

DETAILED DESCRIPTION OF THE PREFERRED EMBODIMENT

The present invention combines mathematical properties and individual strategy so that a contestant can compete against other opponents in a bracket form of play. The method of play in the preferred embodiment is online and therefore in communication with at least one server or computing hardware. The bracketing of the present invention permits each contestant with an initial 12 opportunities to compete. In the preferred embodiment of the present invention, each contestant will compete against up to 248,832 contestants. The breakdown of the competition is conducted via bracketing. In the preferred embodiment, each contestant begins play within the auspices of secondary brackets that are inter-connected amount 1,728 leagues. Brackets then branch off from the leagues in such a manner that successful contestants make it past initial secondary brackets, through primary brackets until the finals with merely 12 teams remaining. The final round takes place during the course of the following season. Overall, the preferred embodiment of the present invention has 144 total brackets.

Figure 1:
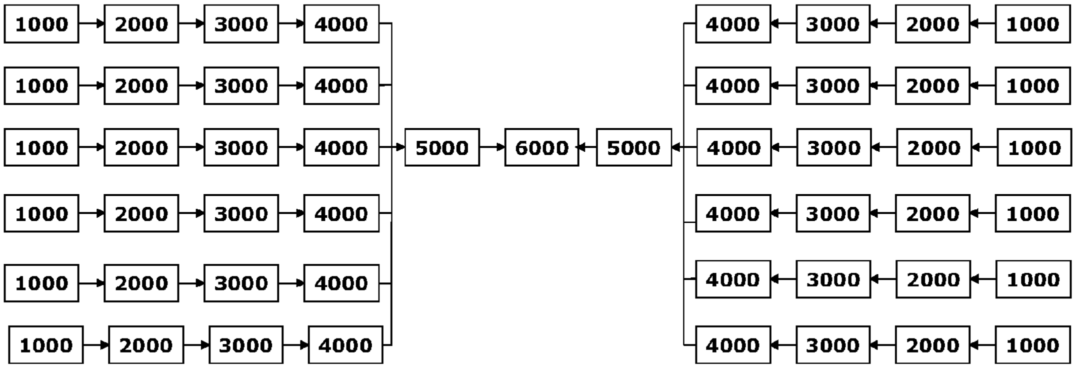
FIG. 1 is a flowchart of the bracketing element of the present invention.

In FIG. 1, we see how the number of the preferred embodiment of the present invention apply to the bracket formula. At the first round (1000), each secondary bracket in the first round (1000) contains 20,736 contestants organized into 1,728 leagues of 12 teams. This accounts for the 248,832 total contestants. At the conclusion of the first round (1000), the winners from each league are tabulated, and the secondary brackets of the second round (2000) are then each populated by 1,728 contestants organized into 144 leagues of 12 teams. At the conclusion of the second round (2000), the winners from each league are tabulated, and the secondary brackets of the third round (3000) are then each populated by 144 contestants organized into 12 leagues of 12 teams. At the conclusion of the third round (3000), the winners are tabulated, and the secondary brackets of the quarterfinal round (4000) are then each populated by 12 contestants organized into one league of 12 teams. At the conclusion of the quarterfinal round (4000), the winners are tabulated, and the secondary brackets are completed and the semi-final round (5000) begins where the primary brackets are each populated by 12 contestants. At the conclusion of the primary brackets of the semi-final round (5000), the final round (6000) will commence the following season involving the last remaining 12 contestants.

Figure 2:
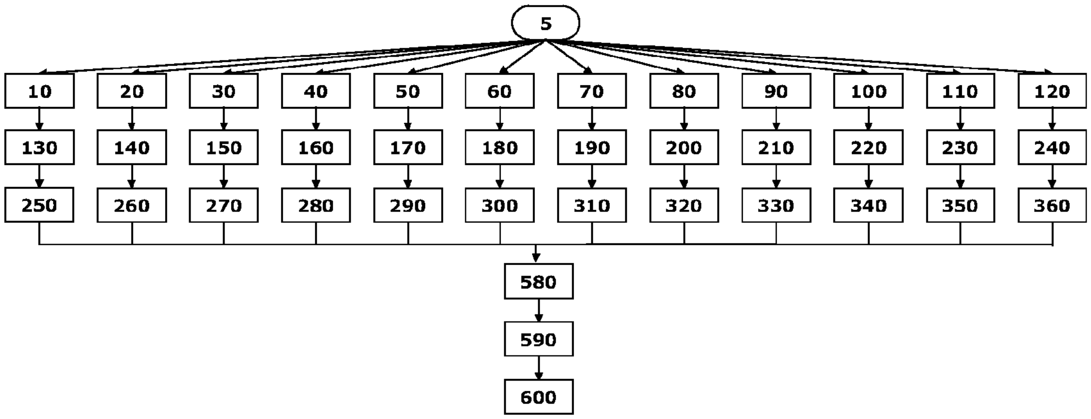
FIG. 2 is a flow chart of the first round of the present invention from the point of view of an individual contestant.

FIG. 2 is a flow chart of the present invention from the perspective of the individual contestants. In the present invention, a contestant logs onto a computing device (5). That computing device is in communication with an online network that stores and gleans information from at least one server. Each contestant is allotted 12 teams (10, 20, 30, 40, 50, 60, 70, 80, 90, 100, 110, 120). Each of the 12 teams operated by the individual contestant are placed within separate secondary brackets of the present invention. Moreover, each secondary bracket is comprised of 12 total teams, each of the 12 teams within the secondary bracket being operated by a different contestant. This means that the initially allotted 12 teams (10, 20, 30, 40, 50, 60, 70, 80, 90, 100, 110, 120) for each individual contestant will be seated in separate secondary brackets. The brackets are set up so that there are 144 total brackets comprised of 12 primary brackets. Within each of the primary brackets are 12 secondary brackets. Every secondary bracket then has 1,728 leagues that branch out. The 12 teams operated by each individual contestant will be placed within the same primary bracket, but each secondary bracket will have one team for each individual contestant.

As we see in FIG. 2, each team from each separate secondary bracket will conduct a draft of players (130, 140, 150, 160, 170, 180, 190, 200, 210, 220, 230, 240). The draft is conducted such that each team operated by a singular contestant will not have the same draft order position. This means that one team out of the 12 teams operated by a contestant will draft first, an additional team will draft second and on up to the $12^{th}$ draft position. This function of the present invention permits each contestant to adopt various draft strategies rather than being limited to completely random draft orders for all teams. However, in the preferred embodiment of the present invention, each of the individual contestant's 12 teams operate through their respective drafts independent of the other 11 teams.

After the draft season begins for all contestants, each contestant will set a roster (250, 260, 270, 280, 290, 300, 310, 320, 330, 340, 350, 360) for each of the 12 teams such that every team ultimately will have a lineup ready to compete using real-world statistics of actual athletes akin to conventional "fantasy" sports gaming. Each roster will be different because of the fact that each contestant conducts 12 drafts for each of his or her 12 teams in 12 different draft orders. As we see in FIG. 2, the competition tabulates statistics and lineup settings for the first week (580), the second week (590) and the third week (600) of the season. Points are accumulated based on the weekly performances of each team. Each contestant with the highest point accumulation in each 12-team league competition of the secondary brackets will advance to the second round.

Figure 3:
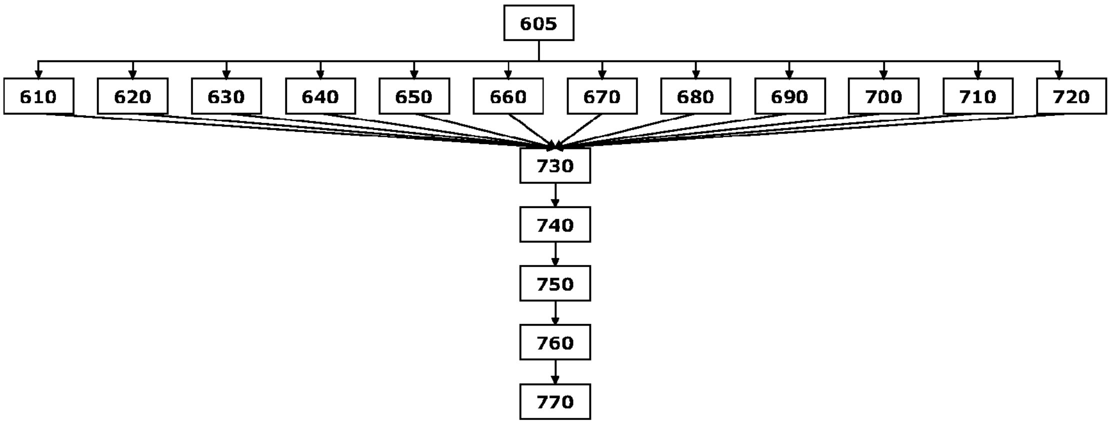
FIG. 3 is a flow chart of additional rounds of the present invention.

FIG. 3 is a flow chart of the second round in the preferred embodiment of the present invention. Based on the brackets and numbers described, the beginning of the second round will reshuffle the leagues such that the number of leagues within this unitary competition will be reduced by $\frac{1}{12}^{th}$ (605). This means that the second round will be reduced to 144 leagues and their respective secondary brackets. Each contestant who advanced to the second round (610, 620, 630, 640, 650, 660, 670, 680, 690, 700, 710, 720) will again join secondary brackets populated by 12 contestants in a similar manner as the first round. One again, each contestant will conduct separate drafts (730). Upon drafting for each team, each contestant will then set his or her lineups for each time (740). The process continues similar to the first round for a fourth week (750), fifth week *760) and sixth week (770) of the season in the preferred embodiment. Again, points are accumulated. Top scoring contestants from each secondary bracket and leagues will advance to the third round. The third round will reduce the number of leagues to 12 as top scoring contestants from the second round populate new brackets, while the primary brackets continue to diminish in the number of contestants and teams.

The third round proceeds in the same manner as the first and second rounds but goes on for four weeks. After the tenth week of the season, points will be accumulated and the top scoring contestants from each league will advance to the fourth round, also referred to as quarterfinals. The semifinal means that the 12 winners of each secondary bracket will go on to play the other secondary bracket winners for a four-week competition. That four-week competition proceeds in similar manner as the previous rounds (see FIG. 1). After the points are accumulated and totaled, the winners will advance representing each primary bracket of the competition. The remainder of the season involves the semi-finals where each advancing contestant in the 12 primary brackets competes against the other contestants in a manner as described in previous rounds. Once the semi-finals conclude, the regular season in the actual sporting season will be at its end. After points are accumulated and totaled, there will be 12 contestants with the highest scores from each primary bracket.

The remaining 12 contestants will compete against each other in the final round. The final round is conducted during the following sporting season. In this manner, the final round is conducted akin to a typical "fantasy" sporting game with the exception that this phase is merely the final round and culmination of the prior season's events. The winner of the final round in the preferred embodiment receives the prize.

The present invention in its preferred embodiment permits each contestant to participate via a computing device that is connected to at least one integrated server. In an additional embodiment, contestants also may employ a kiosk that also is connected via conventional means to at least one integrated server. This kiosk is solely connected to the server and its date information and interaction relating to the present invention. In this manner, a contestant will create an account by using the display screen of the kiosk. The contestant also may enter an account identification code derived from a prepaid subscription. Once logged onto the system of the present invention, the contestant will be assigned 12 teams. Each of the 12 teams will be assigned a position within separate brackets of the present invention. Contestants may then use their account information to log onto the kiosk or other kiosks integrated into the system in order to participate. The kiosks also will tabulate and display scores from across the present invention brackets by gathering such data through the at least one integrated server. In this manner, a contestant can monitor news and updates from across the present invention. Moreover, conventional social networking elements are envisioned in both the kiosk and computing device embodiments so that each contestant can interact with the developments derived from the information contained in the at least one integrated server.

The present invention also relates to each contestant submitting a particular entry fee in order to participate. In one embodiment of the present invention, the winner of the final round would win the pot. This means that if the entry fee were $1, then the pot would be $248,832. A $5 entry fee would create a pot of $1,244,160. A $500 entry fee would create a pot of $124,416,000. These numbers are based on the fact that the preferred embodiment in relation to the brackets permits a finite number of contestants, which in the case of the preferred embodiment is 248,832 contestants. An additional embodiment is to offer prize money from the pot for top scoring contestants for various rounds.

Going back to the preferred embodiment of the present invention, each online contest will have 248,832 contestants. The contestants are divided into 12 brackets. This means that 20,736 contestants are placed in each bracket due to the fact that each contestant receives 12 teams. The initial brackets for the first round, second round, and third round are referred to as secondary brackets. The secondary brackets in the preferred embodiment are identified with a distinctive marking. For example, the preferred embodiment identifies the secondary brackets by an alphanumeric symbol such as #A through #L. The number represents the primary bracket and the letter represents the secondary bracket. This means that each contestant in bracket one will have 12 teams each being placed in a secondary bracket from A through L. For example, a contestant with a team in primary bracket 1 and secondary bracket A will be in bracket 1A. The math of the present invention works out that there will be 20,736 contestants in bracket 1A, and when divided by 12, the number 1,728 emerges. The 1,728 represents the number of leagues in bracket 1A in the embodiment with 12 teams in each league. The math is similar for those in other brackets. The preferred embodiment listing, for example, would be primary bracket 1, secondary bracket A, league #1384, seat 9, or shortened to 1-A-1348-9. Again, this example is just one of many that can be used to identify every team in the present invention that is calculated via the same method. In this example, the seat is the position among the 12 teams in the individual league.

As mentioned above, the winner of each league moves on to the next round. After the conclusion of each round, the total number of leagues in the present invention will be reduced from the previous round. This means that in the preferred embodiment the second round will have 144 leagues and the third round will have 12 leagues. In addition, it should be noted that the contestants in the preferred embodiment who moved on to successive rounds would compete against those contestants who drafted in similar positions. For example, a contestant who was a number one draft pick winner would move into the next round to compete against another number one draft pick winners. Number two draft pick winners would face other number two draft pick winners and so on. This aspect of the present invention provides the opportunity for contestants with similar draft placement and strategy philosophy to compete against each other as they progress through the online contest.

In summary, the present invention is a method for conducting an online contest, providing each contestant with 12 separate entries, and connecting constant data, real-world statistical information, primary brackets and secondary brackets with at least one integrated server. Each of the 12 separate entries is placed into the secondary brackets, populating all of the secondary brackets with 12 teams, and a draft is conducted such that each of the 12 separate entries of the contestant will include 12 draft positions that are different from each other. Furthermore, a first round is begun through setting a roster for each of the 12 entries based on real-world data acquired in the draft and subsequent acquisitions, the roster being set for each of a first week, a second week, and a third week. Points are accumulated in each of the 12 entries based on weekly performance of the real-world data being used in each of the 12 entries, and a highest point total is calculated for each of the secondary brackets, with the contestant with the highest point total in each of the secondary brackets advancing to a second round, and the contestants with the highest point total in each of the secondary brackets placed into new secondary brackets.

Continuing with the summary of the method of the present invention, a second draft is then conducted, setting a second round roster for each of the contestants remaining, with entries based on real-world data acquired in the second draft and subsequent acquisitions, the second round roster being set for each of a fourth week, a fifth week, and a sixth week. Then a highest points total is calculated for each of the secondary brackets with the contestant with the highest point total in each of the secondary brackets advancing to a third round. A third draft is then conducted, setting a third round roster for each of the contestants remaining, with entries based on real-world data acquired in the third draft and subsequent acquisitions, the third round roster being set for each of a seventh week, eighth week, ninth week, and tenth week. Then a highest points total is calculated for each of the secondary brackets, with the contestant with the highest point total in each of the secondary brackets advancing into quarterfinal brackets in a quarterfinal round. A quarterfinal draft is then conducted, setting a quarterfinal round roster for each of the contestants remaining with entries based on real-world data acquired in the quarterfinal draft and subsequent acquisitions, the quarterfinal round roster being set for each of an eleventh week, a twelfth week, a thirteenth week, and a fourteenth week. Then a highest points total is calculated for each of the quarterfinal brackets, with the contestant with the highest point total in each of the quarterfinal brackets advancing to a semi-final bracket in a semi-final round. A semi-final draft is then conducted, setting a semi-final round roster for each of the contestants remaining, with entries based on real-world data acquired in the semi-final draft and subsequent acquisitions, the semi-final round roster being set for the remainder of a regular season. Then a highest points total is calculated for each of the semi-final brackets, with the contestant with the highest point total in each of the semi-final brackets advancing to a final bracket in a final round. A final round is then conducted during a following season, which entails conducting a final draft, and setting a final round roster for each of the contestants remaining, with entries based on real-world data acquired in the final draft and subsequent acquisitions, the final round roster being set each week until a conclusion of the following season. A winner is then selected based on highest points accumulated during the final round.

Continuing with the summary of the method of the present invention, contestant data is entered upon submittal of an entry fee which is placed into a pot, the pot being an accumulation of the entry fee submitted by each contestant and recorded in the at least one integrated server. A winner is awarded prize money from the pot. Participation in the method of the present invention is via a computing device that is connected to the at least one integrated server, and the employment of at least one kiosk for use by a contestant, the at least one kiosk being connected to the at least one integrated server. There will be 248,832 entries fit into the secondary brackets of the first round, requiring the creation of 144 total brackets, 12 primary brackets, and 1,728 leagues from which the secondary brackets branch off. Contestants will move from the first round through the third round with the secondary brackets, with winners of the secondary brackets established as winners of the third round. The winners of the secondary brackets also move into the primary brackets, the primary brackets beginning to be populated by the contestants in the quarterfinals. In addition, the present invention's method establishes the winners of the semi-finals as winners of the primary brackets; the placement of each team that advances to a subsequent round into leagues that are populated with other teams that had a same draft order position in a previous round; and the placement of each team that advances to a subsequent round into leagues that are populated with other teams that were closest to the same draft order position in the previous round, when all of the other teams that had the same draft order position in the previous round already are placed.

Having illustrated the present invention, it should be understood that various adjustments and versions might be implemented without venturing away from the essence of the present invention. The present invention is not limited to the embodiments described above, and should be interpreted as Any and all embodiments within the scope of the following claims.

I claim:

1. A method for conducting an online contest, comprising:

providing each of a plurality of contestants with 12 separate entries in a plurality of contestant accounts, each contestant account having an account identification code associated with a single contestant and managed by at least one integrated server;

connecting contestant data from the contestant account with real-world statistical information, primary brackets and secondary brackets using the at least one integrated server;

electronically placing, via the at least one integrated server, each of the 12 separate entries for each of the plurality of contestants into separate ones of the secondary brackets, thereby electronically populating all of the secondary brackets with 12 teams;

conducting a draft such that each of the 12 separate entries of each contestant will have draft positions that are different from each other, the draft resulting in each of the 12 separate entries in each contestant account managed by the server being populated with an initial roster;

beginning a first round through setting a first round roster for each of the 12 entries of each contestant based on the initial roster acquired in the draft and subsequent acquisitions, the first round roster being set for each of a first week, a second week, and a third week;

accumulating points in each of the 12 entries based on real-world weekly performance of the first round roster as set for the first week, the second week, and the third week, the real-world data being used in each of the 12 entries to determine the points;

calculating, via the at least one integrated server, a points total for each of the entries in each of the secondary brackets, with entries with the highest point total in each of the secondary brackets advancing to a second round to become second round entries, and contestants associated with the second round entries becoming second round contestants;

electronically placing each of the second round entries of the second round contestants that had the highest point total from each secondary bracket into second round secondary brackets;

conducting a second draft in each of the second round secondary brackets, thereby forming a second initial roster for each second round entry;

setting a second round roster for each of the second round entries of the second round contestants, with second round entries based on the second initial roster acquired in the second draft and subsequent acquisitions, the second round roster being set for each of a fourth week, a fifth week, and a sixth week;

calculating, via the at least one integrated server, a points total for each second round entry in each of the second round secondary brackets based on real-world data associated with each second round roster, the second round entries with the highest point total in each of the secondary brackets advancing to become third round entries, each third round entry associated with a third round contestant from among the second round contestants;

electronically placing each of the third round entries into third round secondary brackets;

conducting a third draft in each of the third round secondary brackets, thereby forming a third initial roster for each third round entry;

setting a third round roster for each of the third round entries, with third round entries based on the third initial roster acquired in the third draft and subsequent acquisitions, the third round roster being set for each of a seventh week, eighth week, ninth week, and tenth week;

calculating, via the at least one integrated server, a points total for each of the third round entries in each of the third round secondary brackets based on real-world data associated with each third round roster, the third round entries with the highest point total in each of the third round secondary brackets advancing into quarterfinal brackets in a quarterfinal round to become quarterfinal entries, each quarterfinal entry associated with a quarterfinal contestant from among the third round contestants;

conducting a quarterfinal draft to form a quarterfinal initial roster for each quarterfinal entry;

setting a quarterfinal round roster for each of the quarterfinal entries, with each of the quarterfinal entries based on the quarterfinal initial roster acquired in the quarterfinal draft and subsequent acquisitions, the quarterfinal round roster being set for each of an eleventh week, a twelfth week, a thirteenth week, and a fourteenth week;

calculating, via the at least one integrated server, a points total for each quarterfinal entry in each of the quarterfinal brackets based on real-world data associated with each quarterfinal round roster, with the quarterfinal entries with the highest point total in each of the quarterfinal brackets advancing to a semi-final bracket in a semi-final round to become semi-final entries, each semi-final entry associated with a semi-final contestant from among the quarterfinal contestants;

conducting a semi-final draft to form semi-final initial rosters for each semi-final entry;

setting a semi-final round roster for each of the semi-final entries, with each of the semi-final entries based on semi-final initial rosters acquired in the semi-final draft and subsequent acquisitions, the semi-final round roster being set for one or more weeks;

calculating, via the at least one integrated server, a points total for each semi-final entry in each of the semi-final brackets based on real-world data associated with each semi-final round roster, with the semi-final entries with the highest point total in each of the semi-final brackets advancing to become final round entries in a final bracket in a final round, each of the final round entries associated with a final round contestant from among the semi-final contestants;

conducting a final draft to form a final initial roster;

setting a final round roster for each of the contestants remaining, with entries based on the final initial roster acquired in the final draft and subsequent acquisitions, the final round roster being set each week until a conclusion of a predetermined number of weeks; and awarding a winner based on highest points accumulated during the final round.

2. The method of claim 1, further comprising entering the contestant data and participating upon submitting an entry fee.

3. The method of claim 2, further comprising placing the entry fee submitted by each contestant into a pot.

4. The method of claim 3, further comprising placing the entry fee submitted by each contestant into a pot, the pot being an accumulation of the entry fee submitted by each contestant and recorded in the at least one integrated server.

5. The method of claim 4, further comprising awarding a winner prize money from the pot.

6. The method of claim 1, further comprising participating in the online contest via a computing device that is connected to the at least one integrated server.

7. The method of claim 1, further comprising employing at least one kiosk for use by the contestant, the at least one kiosk being connected to the at least one integrated server.

8. The method of claim 1, further comprising fitting 248,832 entries into the secondary brackets of the first round.

9. The method of claim 8, further comprising creating 144 total brackets.

10. The method of claim 9, further comprising creating 12 primary brackets.

11. The method of claim 9, further comprising creating 1,728 leagues from which the secondary brackets branch off.

12. The method of claim 10, further comprising moving from the first round through the third round with the first, second, and third secondary brackets.

13. The method of claim 12, further comprising establishing winners of the third round to be winners of the third round secondary brackets.

14. The method of claim 13, further comprising moving the winners of the third round secondary brackets into the primary brackets, the primary brackets beginning to be populated by the contestants in the quarterfinals.

15. The method of claim 14, further comprising establishing winners of the semi-finals to be winners of the primary brackets.

16. The method of claim 1, further comprising placing each entry that advances to a subsequent round into leagues that are populated with other teams that had a same draft order position in a previous round.

17. The method of claim 16, further comprising placing each entry that advances to a subsequent round into leagues that are populated with other entries that were closest to the same draft order position in the previous round, when all of the other entries that had the same draft order position in the previous round already are placed.

18. A method for conducting an online contest, comprising:

providing each of a plurality of contestants with 12 separate entries in a plurality of contestant accounts, each contestant account having an account identification code associated with a single contestant and managed by at least one integrated server;

connecting contestant data from the contestant account with real-world statistical information, primary brackets and secondary brackets using the at least one integrated server;

electronically placing, via the at least one integrated server, each of the 12 separate entries for each of the plurality of contestants into separate ones of the secondary brackets, thereby electronically populating all of the secondary brackets with 12 teams;

conducting a draft such that each of the 12 separate entries of each contestant will have draft positions that are different from each other, the draft resulting in each of the 12 separate entries in each contestant account managed by the server being populated with an initial roster;

beginning a first round through setting a first round roster for each of the 12 entries of each contestant based on the initial roster acquired in the draft and subsequent acquisitions, the first round roster being set for each of a first week, a second week, and a third week;

accumulating points in each of the 12 entries based on weekly performance of the real-world data being used in each of the 12 entries;

calculating, via the at least one integrated server, a points total for each of the entries in each of the secondary brackets, with entries with the highest point total in each of the secondary brackets advancing to a second round to become second round entries, and contestants associated with the second round entries becoming second round contestants;

electronically placing each of the second round entries of the second round contestants that had the highest point total from each of the secondary bracket into second round secondary brackets;

conducting a second draft in each of the second round secondary brackets, thereby forming a second initial roster for each second round entry;

setting a second round roster for each of the second round entries of the second round contestants, with second round entries based on the second initial roster acquired in the second draft and subsequent acquisitions, the second round roster being set for each of a fourth week, a fifth week, and a sixth week;

calculating, via the at least one integrated server, a points total for each second round entry in each of the second round secondary brackets based on real-world data associated with each second round roster, the second round entries with the highest point total in each of the secondary brackets advancing to become third round entries, each third round entry associated with a third round contestant from among the second round contestants;

electronically placing each of the third round entries into third round secondary brackets;

conducting a third draft in each of the third round secondary brackets, thereby forming a third initial roster for each third round entry;

setting a third round roster for each of the third round entries, with third round entries based on the third initial roster acquired in the third draft and subsequent acquisitions, the third round roster being set for each of a seventh week, eighth week, ninth week, and tenth week;

calculating, via the at least one integrated server, a points total for each of the third round entries in each of the third round secondary brackets based on real-world data associated with each third round roster, the third round entries with the highest point total in each of the third round secondary brackets advancing into quarterfinal brackets in a quarterfinal round to become quarterfinal entries, each quarterfinal entry associated with a quarterfinal contestant from among the third round contestants;

conducting a quarterfinal draft to form a quarterfinal initial roster for each quarterfinal entry;

setting a quarterfinal round roster for each of the quarterfinal entries, with each of the quarterfinal entries based on the quarterfinal initial roster acquired in the quarterfinal draft and subsequent acquisitions, the quarterfinal round roster being set for each of an eleventh week, a twelfth week, a thirteenth week, and a fourteenth week;

calculating, via the at least one integrated server, a points total for each quarterfinal entry in each of the quarterfinal brackets based on real-world data associated with each quarterfinal round roster, with the quarterfinal entries with the highest point total in each of the quarterfinal brackets advancing to a semi-final bracket in a semi-final round to become semi-final entries, each semi-final entry associated with a semi-final contestant from among the quarterfinal contestants;

conducting a semi-final draft to form semi-final initial rosters for each semi-final entry;

setting a semi-final round roster for each of the semi-final entries, with each of the semi-final entries based on semi-final initial rosters acquired in the semi-final draft and subsequent acquisitions, the semi-final round roster being set for one or more weeks;

calculating, via the at least one integrated server, a points total for each semi-final entry in each of the semi-final brackets based on real-world data associated with each semi-final round roster, with the semi-final entries with the highest point total in each of the semi-final brackets advancing to become final round entries in a final bracket in a final round, each of the final round entries associated with a final round contestant from among the semi-final contestants;

conducting a final draft to form a final initial roster;

setting a final round roster for each of the contestants remaining, with entries based on the final initial roster acquired in the final draft and subsequent acquisitions, the final round roster being set each week until a conclusion of a predetermined number of weeks;

awarding a winner based on highest points accumulated during the final round;

further comprising entering the contestant data upon submitting an entry fee;

further comprising placing the entry fee submitted by each of the contestant into a pot;

further comprising placing the entry fee submitted by each of the contestants into a pot, the pot being an accumulation of the entry fee submitted by each contestant and recorded in the at least one integrated server;

further comprising awarding a winner prize money from the pot;

further comprising employing at least one kiosk for use by the contestant, the at least one kiosk being connected to the at least one integrated server;

further comprising moving the winners of the third round secondary brackets into primary brackets, the primary brackets beginning to be populated by the contestants in the quarterfinals;

further comprising establishing winners of the semi-final brackets to be winners of the primary brackets;

further comprising placing each entry that advances to a subsequent round into leagues that are populated with other entries that had a same draft order position in a previous round; and further comprising placing each entry that advances to a subsequent round into leagues that are populated with other entries that were closest to the same draft order position in the previous round when all of the other entries that had the same draft order position in the previous round already are placed.

19. A method of participating in an online contest via a computing system communicatively connected to an integrated server, the method comprising:

registering as a contestant in the online contest from a computing system communicatively connected to an integrated server, thereby receiving a contestant account having an account identification code;

receiving 12 separate entries associated with the contestant account, each of the 12 separate entries placed into secondary brackets;

participating in an online draft, moderated by the integrated server, such that each of the 12 separate entries of the contestant have draft positions that are different from each other, the draft resulting in each of the 12 separate entries being populated with initial rosters;

setting a first round roster for each of the 12 entries based on the initial roster acquired in the draft and subsequent acquisitions, the first round roster being set for each of a first week, a second week, and a third week, the first round roster selected for accumulating points in each of the 12 entries based on real-world weekly performance of the first round roster as set for the first week, the second week, and the third week, the real-world data being used in each of the 12 entries to determine the points;

for each of the 12 entries, upon a determination by the integrated server that the entry has a highest point total in a secondary bracket, advancing that entry to a second round to become a second round entry, such that each of the second round entries are placed into second round secondary brackets, participating in a second draft in each of the second round secondary brackets, thereby forming a second initial roster for each second round entry;

setting, via a computing system communicatively connected to the integrated server, a second round roster for each of the second round entries based on the second initial roster acquired in the second draft and subsequent acquisitions, the second round roster being set for accumulating points in each of the second round entries based on real-world weekly performance of the second round rosters as set each of a fourth week, a fifth week, and a sixth week;

for each of the second round entries, upon a determination by the integrated server that one or more of the second round entries has a highest point total in a second round secondary bracket, advancing that second round entry to a third round to become a third round entry, such that each of the third round entries are placed into third round secondary brackets, participating in a third draft in each of the third round secondary brackets, thereby forming a third initial roster for each third round entry;

setting, via a computing system communicatively connected to the integrated server, a third round roster for each of the third round entries based on the third initial roster acquired in the third draft and subsequent acquisitions, the third round roster being set for accumulating points in each of the third round entries based on real-world weekly performance of the third round rosters as set each of a seventh week, eighth week, ninth week, and tenth week;

for each of the third round entries, upon a determination by the integrated server that one or more of the third round entries has a highest point total in a third round secondary bracket, advancing that third round entry to a quarterfinal round to become a quarterfinal round entry, such that each of the quarterfinal round entries are placed into quarterfinal brackets, participating in a quarterfinal draft in each of the quarterfinal brackets, thereby forming a quarterfinal initial roster for each quarterfinal round entry;

setting, via a computing system communicatively connected to the integrated server, a quarterfinal round roster for each of the quarterfinal round entries based on the quarterfinal initial roster acquired in the quarterfinal draft and subsequent acquisitions, the quarterfinal round roster being set for accumulating points in each of the quarterfinal round entries based on real-world weekly performance of the quarterfinal round rosters as set each of an eleventh week, a twelfth week, a thirteenth week, and a fourteenth week;

for each of the quarterfinal round entries, upon a determination by the integrated server that one or more of the quarterfinal round entries has a highest point total in a quarterfinal bracket, advancing that quarterfinal round entry to a semi-final round to become a semi-final round entry, such that each of the semi-final round entries are placed into primary brackets, participating in a semi-final draft in each of the semi-final brackets, thereby forming a semi-final initial roster for each semi-final round entry; and setting, via a computing system communicatively connected to the integrated server, a semi-final round roster for each of the semi-final round entries based on the semi-final initial roster acquired in the semi-final draft and subsequent acquisitions, the semi-final round roster being set for accumulating points in each of the semi-final round entries based on real-world weekly performance of the semi-final round rosters as set for each of one or more additional weeks.

20. The method of claim 19, further comprising:

for each of the semi-final round entries, upon a determination by the integrated server that one or more of the semi-final round entries has a highest point total in a primary bracket, advancing that semi-final round entry to a final round to become a final round entry, participating in a final draft, thereby forming a final initial roster for each final round entry; and setting, via a computing system communicatively connected to the integrated server, a semi-final round roster for each of the semi-final round entries based on the semi-final initial roster acquired in the semi-final draft and subsequent acquisitions, the semi-final round roster being set for accumulating points in each of the semi-final round entries based on real-world weekly performance of the semi-final round rosters as set for each of a predetermined number of weeks; and awarding a winner based on highest points accumulated during the final round.

* * * * *